US011236775B1

(12) United States Patent
Crumley (10) Patent No.: US 11,236,775 B1
(45) Date of Patent: Feb. 1, 2022

(54) SILL PLATE ANCHOR ASSEMBLY (71) Applicant: Harvel Crumley, Jacksonville, FL (US)

(72) Inventor: Harvel Crumley, Jacksonville, FL (US)

(\*) Notice: Subject to any disclaimer, the term of this patent is extended or adjusted under 35 U.S.C. 154(b) by 376 days.

(21) Appl. No.: 16/510,575

(22) Filed: Jul. 12, 2019

Related U.S. Application Data (60) Provisional application No. 62/697,834, filed on Jul. 13, 2018.

(51) Int. Cl.
*F16B 13/00* (2006.01)
*E04B 1/41* (2006.01)
*F16B 25/00* (2006.01)

(52) U.S. Cl.
CPC ............. *F16B 13/002* (2013.01); *E04B 1/41* (2013.01); *F16B 25/0031* (2013.01); *F16B 25/0052* (2013.01); *F16B 13/00* (2013.01)

(58) Field of Classification Search
CPC .... F16B 13/00; F16B 13/002; F16B 25/0015; F16B 25/0031; F16B 25/0052; F16B 25/0084; E04B 1/41
USPC ......................... 411/386, 387.1, 387.5, 387.6
See application file for complete search history.

(56) References Cited

U.S. PATENT DOCUMENTS

| 3,600,868 | A |   | 8/1971  | Wilson, Jr. et al. |            |
|-----------|---|---|---------|--------------------|------------|
| 4,322,194 | A | * | 3/1982  | Einhorn            | F16B 13/001 |
|           |   |   |         |                    | 411/30     |
| 4,636,125 | A | * | 1/1987  | Burgard            | A01M 31/00 |
|           |   |   |         |                    | 411/389    |
| 4,763,456 | A | * | 8/1988  | Giannuzzi          | E04D 3/3603 |
|           |   |   |         |                    | 411/133    |
| 5,201,627 | A |   | 4/1993  | Biebenbach         |            |
| 5,829,935 | A | * | 11/1998 | Kendall            | F16B 25/0084 |
|           |   |   |         |                    | 411/387.6  |
| 5,833,415 | A | * | 11/1998 | McSherry           | F16B 13/002 |
|           |   |   |         |                    | 411/31     |
| 6,186,716 | B1| * | 2/2001  | West               | F16B 13/002 |
|           |   |   |         |                    | 411/30     |
| 6,668,501 | B2|   | 12/2003 | Adebar et al.      |            |
| 7,290,972 | B2| * | 11/2007 | Gauthier           | F16B 13/002 |
|           |   |   |         |                    | 411/107    |
| 7,334,374 | B2|   | 2/2008  | Schmid             |            |

(Continued)

OTHER PUBLICATIONS

Alexandr E-Business Co. Ltd, Jun. 9, 2018, www.aliexpress.com/item/2pcs-Twist-Step-Drill-Bit-10mm-shank-to-6mm-Twist-Bits-9mm-shank-to-5mm-Pocket/32496432854.html.

(Continued)

*Primary Examiner* — Roberta S Delisle
(74) *Attorney, Agent, or Firm* — Stephen E. Kelly; Hill Ward Henderson, P.A.

(57) ABSTRACT

An assembly for connecting a wooden sill plate to a concrete foundation slab. The assembly comprises a tapping drill bit and an anchor device. The tapping drill bit comprises a flute having a first flute section and a second flute section, the first flute section being longer and having a smaller diameter than the corresponding dimensions of the second flute section. The anchor device comprises a first anchor section and a second anchor section. The anchor device is structured such that the first anchor section is configured for embedment into the concrete foundation slab, and the second anchor section is configured for embedment in the wooden sill plate. The anchor device thereby delivers an advantageous distribution of shear forces that act on the wooden sill plate in relation to the concrete floor slab.

20 Claims, 7 Drawing Sheets

(56) References Cited

U.S. PATENT DOCUMENTS

| | | | |
|---|---|---|---|
| 7,934,895 B2 * | 5/2011 | Ernst | F16B 37/127 411/44 |
| 8,037,653 B2 | 10/2011 | Hohmann, Jr. | |
| 8,057,147 B2 * | 11/2011 | Ernst | F16B 35/048 411/387.1 |
| 8,382,414 B2 * | 2/2013 | Vandenberg | F16B 25/0015 411/402 |
| 8,545,140 B2 | 10/2013 | Burn | |
| 2005/0008450 A1 * | 1/2005 | Gauthier | F16B 13/002 411/387.1 |
| 2006/0165506 A1 * | 7/2006 | Panasik | F16B 13/002 411/30 |
| 2008/0292421 A1 * | 11/2008 | Lin | F16B 13/061 411/30 |
| 2008/0292422 A1 * | 11/2008 | Lin | F16B 13/124 411/31 |
| 2011/0286814 A1 * | 11/2011 | Hettich | F16B 35/041 411/386 |
| 2016/0003283 A1 * | 1/2016 | Call | F16B 25/0021 411/387.1 |
| 2016/0061247 A1 * | 3/2016 | Gong | F16B 25/0021 411/387.2 |
| 2016/0215810 A1 * | 7/2016 | Echito | F16B 25/103 |
| 2018/0156255 A1 * | 6/2018 | Kowalenko | F16B 37/127 |

OTHER PUBLICATIONS

Kangteertool Store, Jun. 9, 2018, www.aliexpress.com/item/M6-180-Degree-Straight-Shank-Stepped-Drill-6-6mm-Down-to-11mm-Drill-Bit/32724084033.html.

Kreg, Jun. 9, 2018, www.woodcraft.com/products/kreg-1-2-x-1-4-step-drill-bit-with-stop-collar-for-kreg-jig-hd-kreg-kjdhd.

Walter, Jun. 9, 2018, www.directindustry.com/prod/walter/product-5602-1074051.html.

Famag, Jun. 9, 2018, www.rutlands.co.uk/sp+power-tool-accessories-drilling-boring-stepped-bits-stepped-drill-bit-famag+1886050.

Guangdong Shunde Xinfang Woodworking Machinery, Jun. 9, 2018, www.chinahao.com/product/39195072495/.

\* cited by examiner

SILL PLATE ANCHOR ASSEMBLY

CROSS-REFERENCE TO RELATED APPLICATION

Pursuant to 35 U.S.C. §§ 119(e), this application claims the benefit of U.S. Provisional Patent Application Ser. No. 62/697,834, filed on Jul. 13, 2018, the entire contents of each of which are incorporated herein by this reference.

BACKGROUND

(1) Field of Endeavor

The present invention relates generally to the field of building frame anchor devices, and more particularly, to anchor assemblies for anchoring wooden sill plates to a concrete foundation and drill bits for tapping corresponding anchor holes.

(2) Description of Related Art

Many residential and low-rise buildings combine wooden frames and concrete foundations, where a wooden base plate, or sill plate, is anchored to the concrete foundation slab. The wooden frames must be anchored to the concrete foundation in a manner that adequately secures a wooden sill plate to the concrete slab, accounting for the long-term effects of creep, shrinkage, compression, and deterioration of the wooden base plates. A common anchoring technique is to provide an anchor bolt that is used to anchor the wooden base plate to the concrete foundation. However, typical anchor bolts are made of steel, and they have a relatively small, uniform diameter along their full length. As a wooden base plate shears in relation to the concrete foundation, the wood bears against the steel anchor bolt. Since these anchor bolts have a relatively small diameter, the bearing area is relatively small, and the bearing stress on the wood is relatively high. It is common for this localized stress to cause a localized, destructive effect on the wood in proximity to the anchor bolt. This localized destruction typically materializes in crushing, tearing, breaking, or cracking of the wooden sill plate in proximity to the anchor bolt.

The present anchor assembly seeks to overcome these problems by providing for the installation of a stepped anchor device that reduces the local stress on the wooden sill plate member.

SUMMARY

The device is a stepped anchor assembly having a multi-section tapping drill bit and a multi section anchor device. In an embodiment, the tapping drill bit has a shank, a stop, and a flute, where the shank, stop, and flute are operatively connected. The flute comprises a first flute section and a second flute section. The first flute section comprises a first flute length and a first flute diameter, the first flute section terminating at a drill bit tip. The first flute length has concrete cutting blades that extend for at least a portion of the first flute length, the concrete cutting blades terminating at, or in proximity to, the drill bit tip.

The flute further comprises a second flute section that has a second flute length and a second flute diameter and a cutting tip. In an embodiment, the second flute section 20 has wood cutting blades and a top terminating in proximity to the stop. The opposite end of the second flute section comprises a cutting tip that terminates at a location between the stop and the drill bit tip. In this embodiment, the wood cutting blades extend for at least a portion of the second flute length, terminating at the cutting tip at about 180-degree angle. In another embodiment of the second flute section, the cutting tip comprises two or more cutting teeth for cutting the wooden sill plate member. The cutting teeth are chisel-like cutting members having a sharp leading edge for cutting the wooden sill plate member as the tapping drill bit rotates.

In an embodiment of the cutting tip, the cutting tip further comprises a recess located adjacent to the leading edge of each of the cutting teeth. The recess is configured to promote penetration of the leading edges into the wooden sill plate member as the tapping drill bit is engaged in the rotational cutting action.

In another embodiment, the second flute section takes the shape of a truncated cone such that the diameter of the second flute section in the vicinity of the cutting tip is larger than the diameter of the second flute section in the vicinity of the top.

One embodiment of the anchor device comprises a head and a shank, the shank comprising a first anchor section and a second anchor section. The first anchor section has a first anchor length, a first anchor diameter, and an anchor tip.

In one embodiment of the first anchor section, the surface of the first anchor section is substantially smooth. In another embodiment of the first anchor section, the surface of the first anchor section comprises a first surface texture, such as a spiral rib or ridge, knobs, protrusions, or other raised features or members. The second anchor section comprises a second anchor length and a second anchor diameter. The second surface texture is configured for engaging cured in place epoxy, grout, or other bonding material, as described below.

DESCRIPTION OF THE PREFERRED EMBODIMENTS

With reference to the drawings, the anchor installation assembly will now be described with regard for the best mode and the preferred embodiment. In general, the anchor installation assembly is an assembly for anchoring a wooden sill plate to a concrete foundation slab. The embodiments disclosed herein are meant for illustration and not limitation of the invention. An ordinary practitioner will appreciate that it is possible to create many variations of the following embodiments without undue experimentation.

Figure 1:
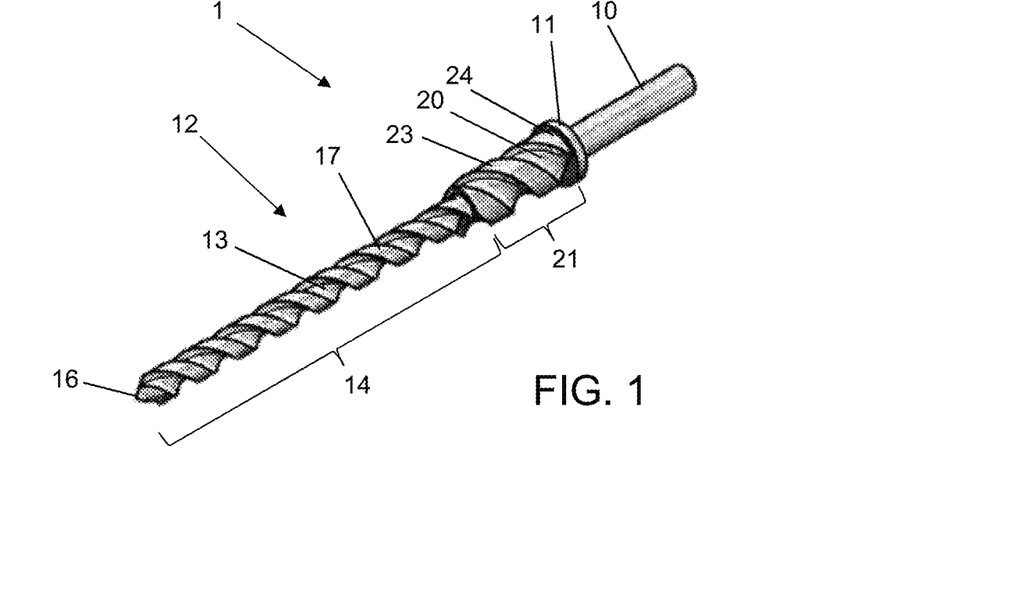
FIG. 1 is an isometric view of one embodiment of the tapping drill bit.
Figure 2:
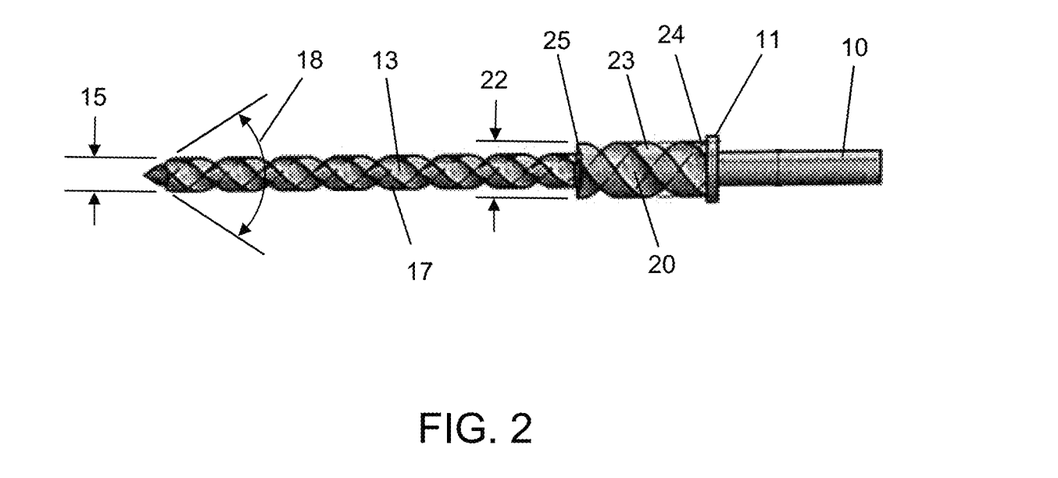
FIG. 2 is a side view of one embodiment of the tapping drill bit.
Figure 11:
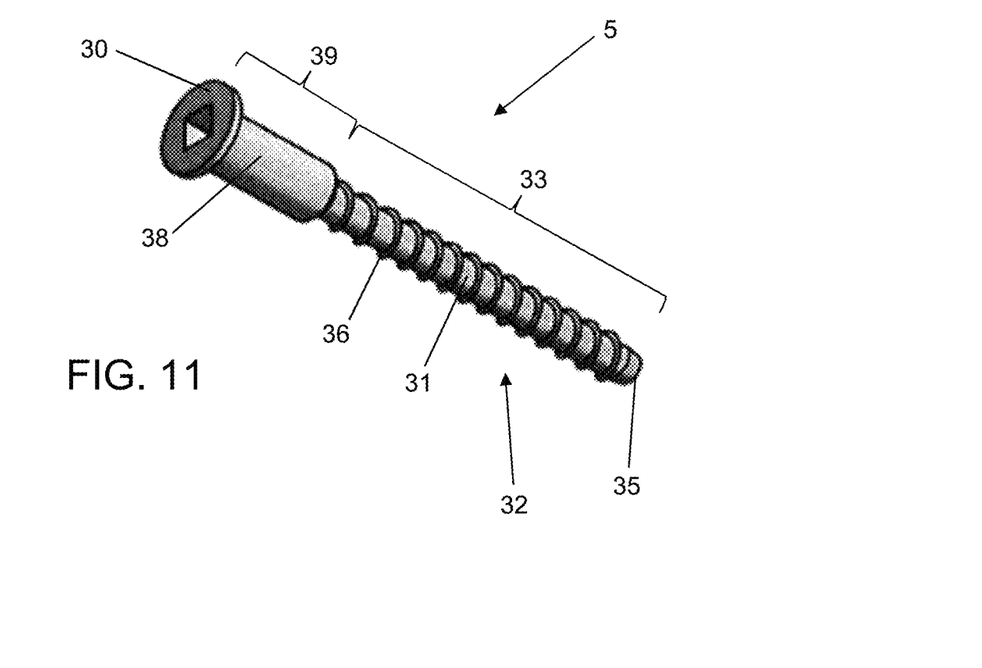
FIG. 11 is an isometric view of one embodiment of the anchor device.

Referring to FIGS. 1-2, the anchor installation assembly comprises a tapping drill bit 1 and an anchor device 5 (shown in FIG. 11). In an embodiment, the tapping drill bit 1 has a shank 10, a stop 11, and a flute 12, where the shank 10, stop 11, and flute 12 are operatively connected. For example, in one embodiment of the tapping drill bit 1, the flute 12 comprises a first flute section 13 and a second flute section 20 as a two-piece assembly connected by mechanical fasteners 27 (shown in FIG. 3). In another embodiment, the first flute section 13 and second flute section 20 are integrally connected as a one-piece unit. In either of these two embodiments, the shank 10 is sized to fit into a chuck on a variety of power drills known to an ordinary practitioner. The stop 11 is a knob, nub, protrusion, collar, collar stop, or other member that prevents over-penetration of the tapping drill bit 1, as described below. The first flute section 13 comprises a first flute length 14 and a first flute diameter 15, the first flute section 13 terminating at a drill bit tip 16. The first flute length 14 has concrete cutting blades 17 that extend the for at least a portion of the first flute length 14, the concrete cutting blades 17 terminating at, or in proximity to, the drill bit tip 16 at a point angle 18 of less than 180 degrees.

The flute 12 further comprises a second flute section 20 that has a second flute length 21 and a second flute diameter 22 and a cutting tip 25. In an embodiment, the second flute section 20 has wood cutting blades 23 and a top 24 terminating in proximity to the stop 11. The opposite end of the second flute section 20 comprises a cutting tip 25 that terminates at a location between the stop 11 and the drill bit tip 16. In this embodiment, the wood cutting blades 23 extend for at least a portion of the second flute length 21, terminating at the cutting tip 25 at about 180-degree angle. In another embodiment, the wood cutting blades 23 terminate at the cutting tip 25 at an angle of less than 180-degrees.

Figure 3:
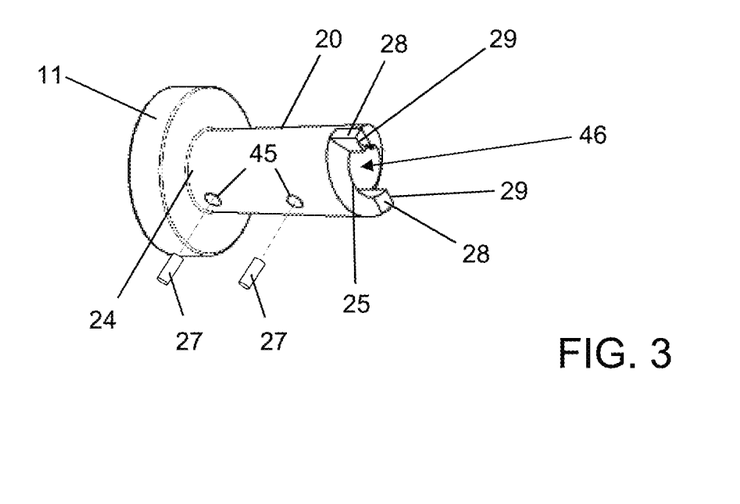
FIG. 3 is an isometric view of one embodiment of the second flute section of the tapping drill bit.
Figure 4:
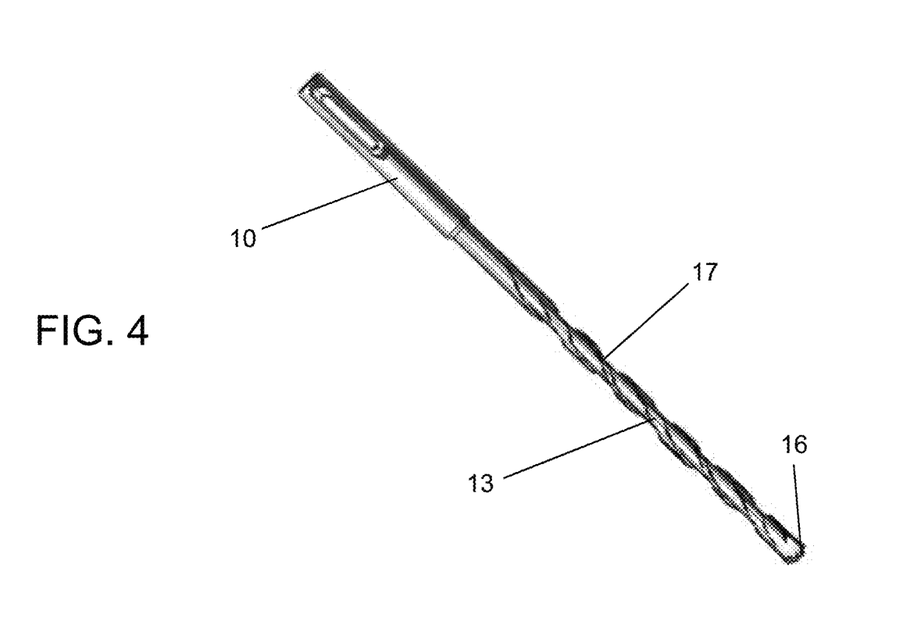
FIG. 4 is a side view of one embodiment of the shank and first flute section of the tapping drill bit.
Figure 5:
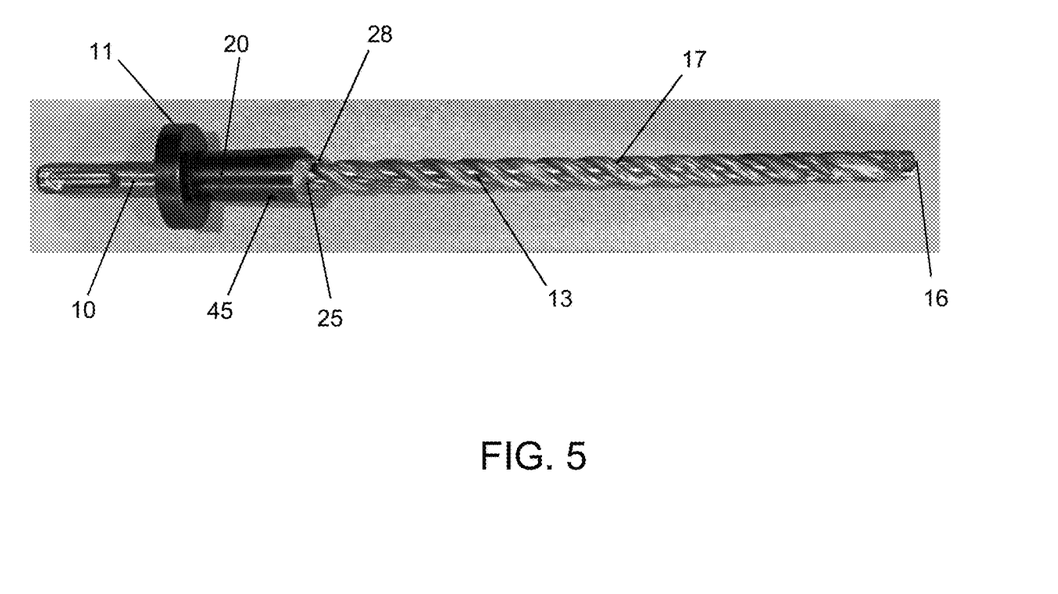
FIG. 5 is a side view of the second section shown in FIG. 3 connected to the shank and first flute section shown in FIG. 4.
Figure 6:
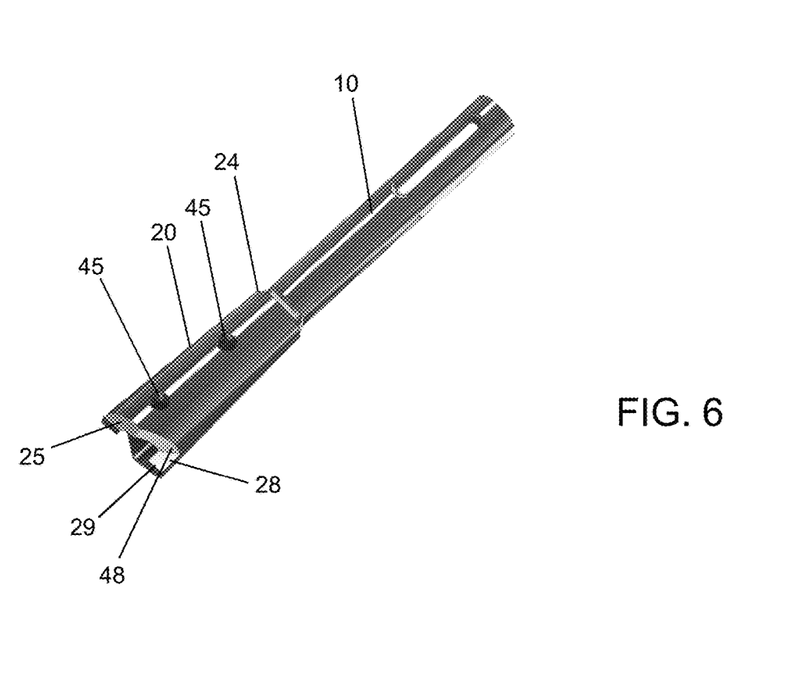
FIG. 6 is an isometric view of one embodiment of the second flute section attached to the shank of the tapping drill bit.

In an embodiment of the second flute section 20, shown in FIGS. 3-5, the second flute section 20 comprises a substantially smooth surface without wood cutting blades 23. The cutting tip 25 comprises two or more cutting teeth 28 for cutting the wooden sill plate member 7. For example, one embodiment comprises two cutting teeth 28 disposed on the cutting tip 25 approximately opposite each other, or at approximately 180-degrees of separation between the two cutting teeth 28. In another embodiment, three cutting teeth 28 are disposed approximately 120-degrees apart. In another embodiment, four cutting teeth 28 are disposed at approximately 90-degrees apart. Between the cutting teeth 28, the cutting tip 25 is beveled such that the cutting tip 25 comprises an angle of less than 180-degrees.

In this embodiment, the cutting teeth 28 are chisel-like cutting members having a sharp leading edge 29 for cutting the wooden sill plate member 7 as the tapping drill bit 1 rotates. The second flute section 20 further comprises fastening holes 45 for receiving mechanical fasteners 27 that secure the second flute section 20 to the bit shank 10 or some other portion of the tapping drill bit 1. The stop 11 is affixed to the top 24 of the second flute section 20. The second flute section 20 comprises a receiving hole 46 for receiving the bit shank 10, the receiving hole 46 disposed axially inside the second flute section 20.

After the bit shank 10 is inserted into the receiving hole 46 to the appropriate depth, the mechanical fasteners 27 are inserted into the fastening holes 45 and tightened such that the second flute section 20 is rotatably secured in fixed relation to the bit shank 10. To this end, the mechanical fasteners 27 are preferably a set screw, a tapping screw, a rivet, a pin, detent, or some other suitable mechanical device. Preferably, after installation the mechanical fastener 27 sits below the surface of the second flute section 20 so that there is no protruding head or other component of the mechanical fastener 27 that will interfere with the drilling action of the second flute section 20 cutting into the plate member 7.

Figure 7:
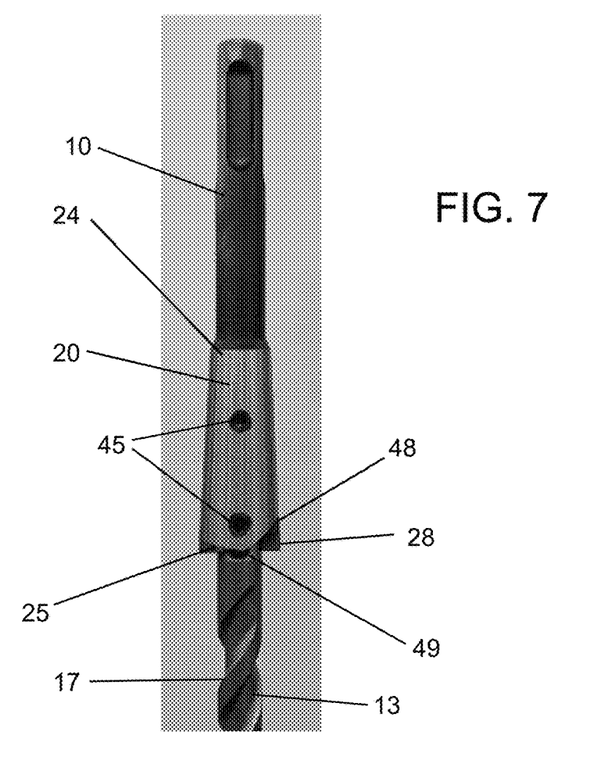
FIG. 7 is a front view of one embodiment of the second flute section attached to the shank of the tapping drill bit.
Figure 8:
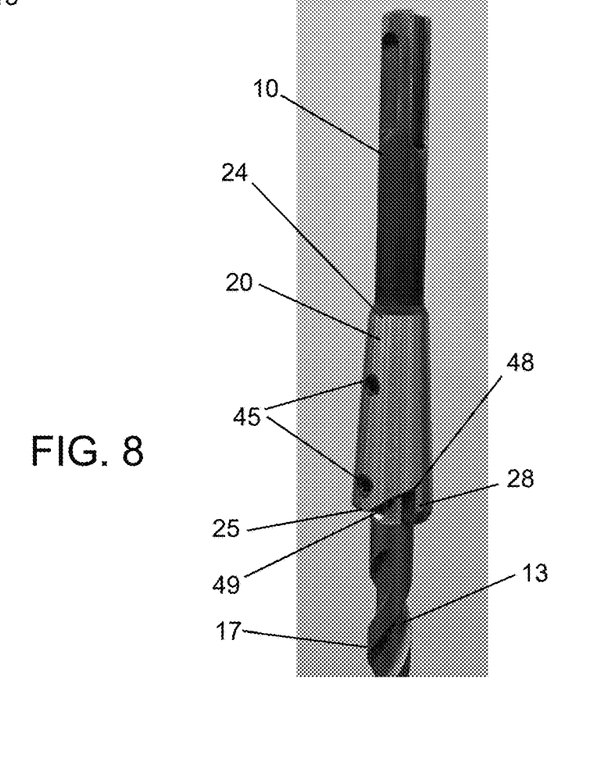
FIG. 8 is a front-side view of one embodiment of the second flute section attached to the shank of the tapping drill bit.
Figures 9, 10:
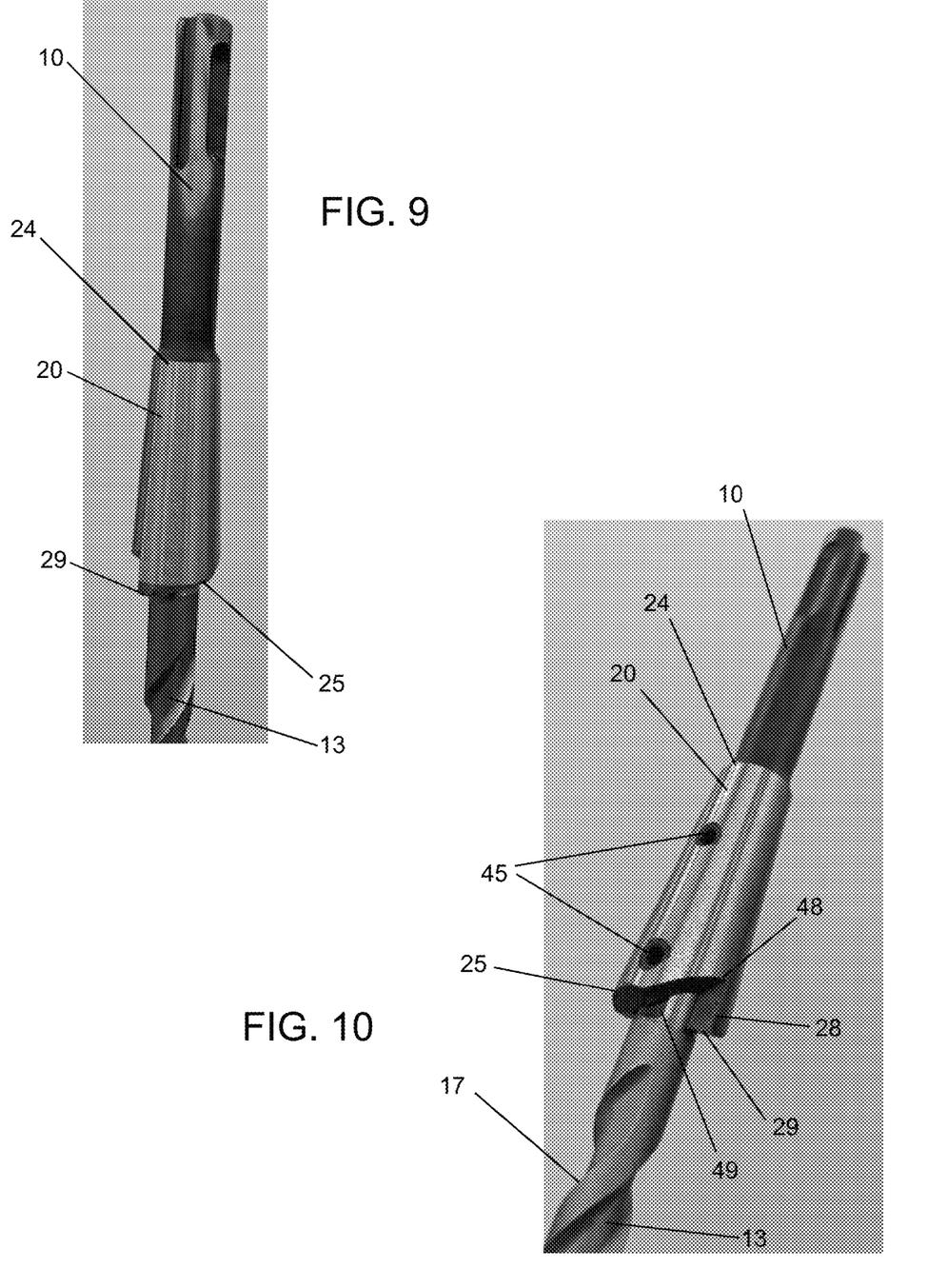
FIG. 9 is a side view of one embodiment of the second flute section attached to the shank of the tapping drill bit.
FIG. 10 is an isometric view of one embodiment of the second flute section attached to the shank of the tapping drill bit.

In an embodiment of the bit shank 10, the bit shank 10 further comprises a seat member 49 for receiving contact from the mechanical fastener 27. The seat member 49 promotes secure engagement by the mechanical fastener 27, which further promoting retention of the second flute section 20 in relation to the bit shank 10. The seat member 49 could be a bore hole, threaded or unthreaded (see FIG. 7). As an alternative to a bore hole, the seat member 49 is a flat or recessed area on the surface of the bit shank 10 configured to, for example, receive the distal end of a set screw or other mechanical fastener 27 (see FIG. 10).

In another embodiment, shown in FIGS. 6-10, the second flute section 20 takes the shape of a truncated cone such that the diameter of the second flute section 20 in the vicinity of the cutting tip 25 is larger than the diameter of the second flute section 20 in the vicinity of the top 24. This embodiment can be deployed with or without a stop 11.

Referring again to FIGS. 6-10, in an embodiment of the cutting tip 25, the cutting tip further comprises a recess 48 located adjacent to the leading edge 29 of each of the cutting teeth 28. In other words, the recess 48 is located in front of the leading edge 29 in relation to the rotational direction that enables the cutting action by the cutting teeth 28. The recess 48 is configured to promote penetration of the leading edges 29 into the wooden sill plate member 7 as the tapping drill bit 1 is engaged in the rotational cutting action.

Figure 12:
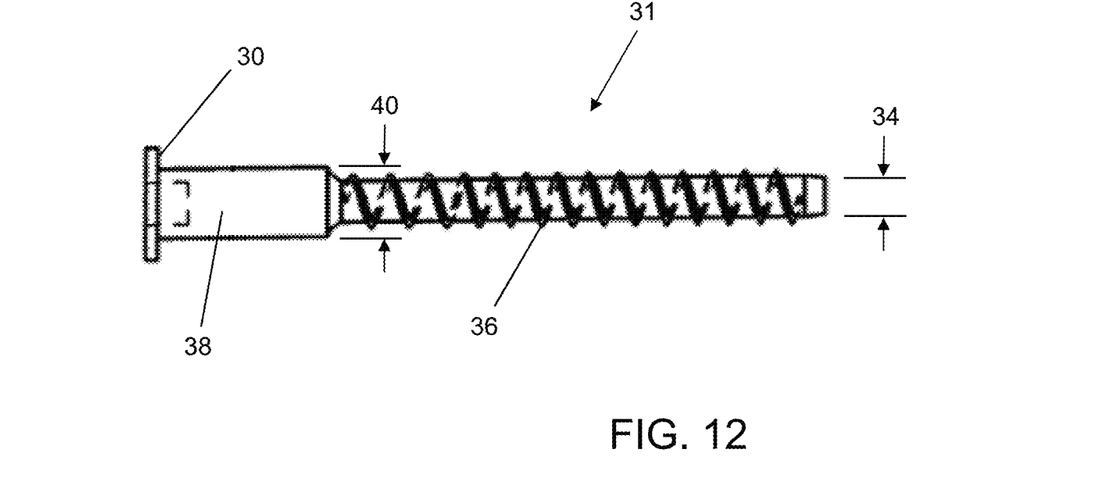
FIG. 12 is a cross section of one embodiment of the anchor device.

Referring to FIGS. 11-12, one embodiment of the anchor device 5 comprises a head 30 and a shank 31, the shank 31 comprising a first anchor section 32 and a second anchor section 38. The first anchor section 32 has a first anchor length 33, a first anchor diameter 34, and an anchor tip 35. The anchor tip 35 preferably comprises a streamlining feature, such as a point, rounded end, or annular chamfer to enable insertion of the anchor device 5 into a pre-drilled anchor hole.

In one embodiment of the first anchor section 32, the surface of the first anchor section 32 is substantially smooth. In another embodiment of the first anchor section 32, the surface of the first anchor section 32 comprises a first surface texture 36, such as a spiral rib or ridge, knobs, protrusions, or other raised features or members. The first surface texture 36 is configured for engaging cured in place epoxy, grout, or other bonding material, as described below. The first anchor diameter 34 does not account for the thickness of the first surface texture 36, if any.

The second anchor section 38 comprises a second anchor length 39 and a second anchor diameter 40. Preferably, but not necessarily, the surface of the second section 30 is substantially smooth. In another embodiment of the second anchor section 38, the surface comprises a second surface texture, such as a spiral rib or ridge, knobs, protrusions, or other raised features or members. The second surface texture is configured for engaging cured in place epoxy, grout, or other bonding material, as described below. The second anchor diameter 40 does not account for the thickness of the second surface texture, if any.

Figure 13:
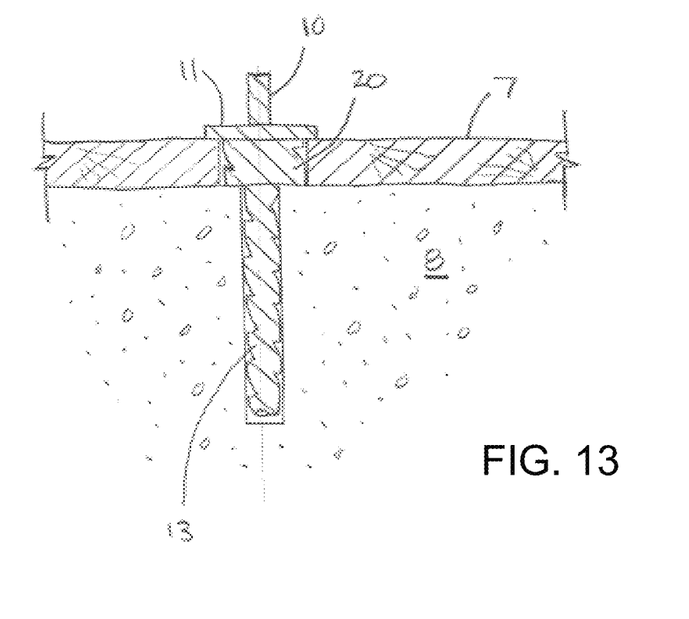
FIG. 13 is a cross section of one embodiment of the tapping drill bit having completed installation of anchor holes in the plate member and the concrete foundation.
Figure 14:
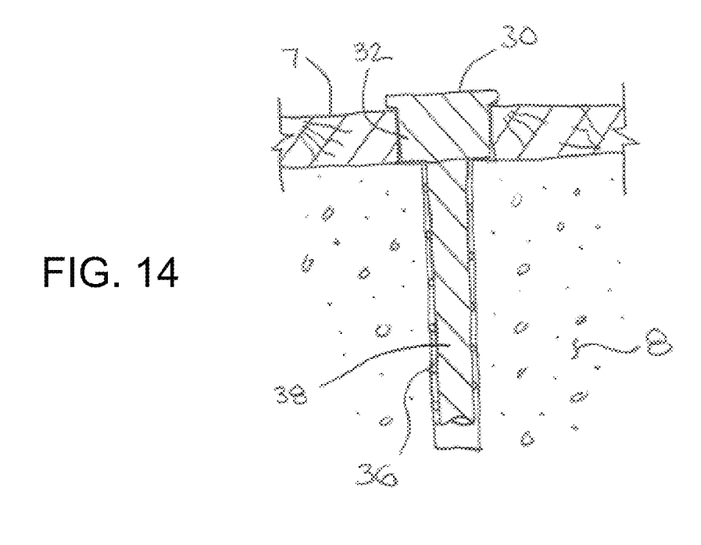
FIG. 14 is a cross section of one embodiment of the anchor device installed in the anchor holes drilled as shown in FIG. 5.

Referring to FIGS. 13-14, the anchor device 5 is used to secure a plate member 7, such as a wooden sill plate, to a concrete foundation 8. The first flute section 13 of the flute 12 is sized to form a hole in the concrete foundation 8 with enough length to develop adequate strength in the anchor device 5, as described below. The second flute section 20 of the flute 12 is sized to enable full insertion of the second anchor section 38 of the anchor device 5 without over-penetrating into the concrete foundation 8. That is, the distance between the cutting tip 25 and the stop 11 is preferably equal to or less than the thickness of the plate member 7.

Once the plate member 7 is placed in its intended location, the tapping drill bit 1 is used to pre-drill an anchor hole for installing the anchor device 5. As the drilling process proceeds, the drill bit tip 16 penetrates through the plate member 7 and into the concrete foundation 8. The tapping drill bit 1 continues this penetration until its progress is halted by the stop 11, which abuts against the top of the plate member 7. Installation of the anchor hole is then complete, and the tapping drill bit 1 is in the configuration shown in FIG. 13 (power drill not shown). The tapping drill bit 1 is then backed out of the anchor hole.

The next step is installation of the anchor device 5. In one embodiment, cured in place bonding material is inserted into the anchor hole before the anchor device 1 is inserted. Once the bonding material is inserted, the anchor device 5 is fully inserted into the anchor hole, as shown in FIG. 14. The bonding material cures in place, thereby engaging the first surface texture 36 to firmly retain the anchor device 5 in place. The anchor hole should be installed deeply enough so that the bond between the bonding material and the anchor device 5 develops enough pull-out resistance to resist the design loads required to be carried by the anchor device 5. In this configuration, the second anchor section 38 of the anchor device 5 is installed to a depth substantially equal to, or slightly less than, the thickness of the plate member 7.

In an alternative embodiment, bonding material is also placed in the pre-drilled hole in the plate member 7 so that this bonding material engages the surface of the second anchor section 38 of the anchor device 5. The strength of this bond can be further enhanced by a second surface texture 41 on the surface of the second anchor section 38.

Certain proportions of the anchor device 5 have been discovered to be unexpectedly advantageous for promoting the intended purpose of the anchor assembly. Certain ratios of the first anchor length 33 and second anchor length 39, as well as the first anchor diameter 34 and the second anchor diameter 40, have unexpectedly delivered superior results in preventing localized damage to plate members 7 secured with these anchor devices 5. Examples of these ratios are provided in the following embodiments.

In an embodiment of the anchor device 5, the second anchor length 39 is between about ⅕ and about ⅜ of the length of the first anchor length 33. In an embodiment of the anchor device 5, the second anchor length 39 is between about ¼ and about ⅜ of the length of the first anchor length 33. In an embodiment of the anchor device 5, the second anchor length 39 is between about ⅓ and about ⅜ of the length of the first anchor length 33. In an embodiment of the anchor device 5, the second anchor length 39 is at least ⅜ of the length of the first anchor length 33.

In an embodiment of the anchor device 5, the second anchor diameter 40 is at least 33.3% larger than the first anchor diameter 34. In an embodiment of the anchor device 5, the second anchor diameter 40 is at least 37.5% larger than the first anchor diameter 34. In an embodiment of the anchor device 5, the second anchor diameter 40 is at least 50% larger than the first anchor diameter 34.

In an embodiment of the anchor device 5, the second anchor length 39 is between about ⅕ and about ⅜ of the length of the first anchor length 33, and the second anchor diameter 40 is at least 33.3% larger than the first anchor diameter 34. In an embodiment of the anchor device 5, the second anchor length 39 is between about ⅕ and about ⅜ of the length of the first anchor length 33, and second anchor diameter 40 is at least 37.5% larger than the first anchor diameter 34. In an embodiment of the anchor device 5, the second anchor length 39 is between about ⅕ and about ⅜ of the length of the first anchor length 33, and second anchor diameter 40 is at least 50% larger than the first anchor diameter 34.

In an embodiment of the anchor device 5, the second anchor length 39 is between about ¼ and about ⅜ of the length of the first anchor length 33, and the second anchor diameter 40 is at least 33.3% larger than the first anchor diameter 34. In an embodiment of the anchor device 5, the second anchor length 39 is between about ¼ and about ⅜ of the length of the first anchor length 33, and the second anchor diameter 40 is at least 37.5% larger than the first anchor diameter 34. In an embodiment of the anchor device 5, the second anchor length 39 is between about ¼ and about ⅜ of the length of the first anchor length 33, and the second anchor diameter 40 is at least 50% larger than the first anchor diameter 34.

In an embodiment of the anchor device 5, the second anchor length 39 is between about ⅓ and about ⅜ of the length of the first anchor length 33, and the second anchor diameter 40 is at least 33.3% larger than the first anchor diameter 34. In an embodiment of the anchor device 5, the second anchor length 39 is between about ⅓ and about ⅜ of the length of the first anchor length 33, and the second anchor diameter 40 is at least 37.5% larger than the first anchor diameter 34. In an embodiment of the anchor device 5, the second anchor length 39 is between about ⅓ and about ⅜ of the length of the first anchor length 33, and the second anchor diameter 40 is at least 50% larger than the first anchor diameter 34.

In an embodiment of the anchor device 5, the second anchor length 39 is at least ⅜ of the length of the first anchor length 33, and the second anchor diameter 40 is at least 33.3% larger than the first anchor diameter 34. In an embodiment of the anchor device 5, the second anchor length 39 is at least ⅜ of the length of the first anchor length 33, and the second anchor diameter 40 is at least 37.5% larger than the first anchor diameter 34. In an embodiment of the anchor device 5, the second anchor length 39 is at least ⅜ of the length of the first anchor length 33, and the second anchor diameter 40 is at least 50% larger than the first anchor diameter 34.

The tapping drill bit 1 is sized to install a tapped hole of a size to snugly accommodate an anchor device 5 of one of the embodiments described above. Since the resistance force delivered by the anchor device 5 is developed through skin friction and through bonding with the bonding agent, the first flute length 14 of the tapping drill bit 1 is preferably longer than (and even substantially longer than) the first anchor length 33 of the anchor device 5. The first flute diameter 15 of the tapping drill bit 1 should be sized to install an anchor hole in the concrete foundation 8 where the anchor hole is sized to snugly receive the first anchor diameter 34 of the anchor device 5, along with any first surface texture 36 and corresponding bonding agent. The second flute diameter 22 of the tapping drill bit 1 should be sized to install an anchor hole in the plate member 7 sized to snugly receive the second anchor diameter 40 of the anchor device 5, along with any second surface texture 41 and corresponding bonding agent, if any.

The foregoing embodiments are merely representative of the anchor assembly and not meant for limitation of the invention. For example, persons skilled in the art will appreciate that there are several embodiments and configurations of individual features of the tapping drill bit 1 and anchor device 5 that will not substantially alter the nature of the anchor assembly. Consequently, it is understood that equivalents and substitutions for certain elements and components set forth above are part of the invention, as set forth in the claims below.

I claim:

1. A sill plate anchor assembly for anchoring a wooden sill plate to a concrete floor slab, the sill plate assembly comprising:
    a tapping drill bit and an anchor device, the tapping drill bit having a shank, a stop, and a flute, the flute comprising:
        a first flute section having a first flute length and a first flute diameter, the first flute section terminating at a drill bit tip, and at least a portion of the first flute length comprising concrete cutting blades terminating at the tip; and
        a second flute section having a second flute length and a second flute diameter, the second flute length having a top in proximity to the stop and a distal end terminating at a cutting tip, at least a portion of the second flute length comprising wood cutting blades that terminate at the cutting tip;
        wherein the first flute length is greater than the second flute length, and the first flute diameter is less than the second flute diameter; and
    the anchor device comprising a head and a shank, the shank having a first anchor portion with a first anchor diameter and a first anchor length, and a second anchor portion with a second anchor diameter and a second anchor length, the first anchor length being greater than second anchor length, and the first anchor diameter being less than the second anchor diameter, the first anchor portion having a surface texture for engaging cured in place bonding material, and the second anchor portion having a smooth surface.

2. The sill plate anchor assembly of claim 1, wherein the second flute length is at least ¼ of the length of the first flute length.

3. The sill plate anchor assembly of claim 2, wherein the second flute diameter is at least ⅓ larger than the first flute diameter.

4. The sill plate anchor assembly of claim 1, wherein the second flute length is at least ⅓ of the length of the first flute length.

5. The sill plate anchor assembly of claim 1, wherein the second flute length is at least ⅜ of the length of the first flute length.

6. The sill plate anchor assembly of claim 1, wherein the second flute diameter is at least ⅓ larger than the first flute diameter.

7. The sill plate anchor assembly of claim 1, wherein the second flute diameter is at least ⅓ larger than the first flute diameter.

8. A sill plate anchor assembly for anchoring a wooden sill plate to a concrete floor slab, the sill plate assembly comprising:
    a tapping drill bit and an anchor device, the tapping drill bit having a shank and a flute, the flute comprising:
        a first flute section having a first flute length and a first flute diameter, the first flute section terminating at a drill bit tip, and at least a portion of the first flute length comprising concrete cutting blades terminating at the tip; and
        a second flute section having a second flute length and a second flute diameter, the second flute length having a top and a distal end terminating at a cutting tip having two or more cutting teeth for cutting a wooden sill plate member;
        wherein the first flute length is greater than the second flute length, and the first flute diameter is less than the second flute diameter; and
    the anchor device comprising a head and a shank, the shank having a first anchor portion with a first anchor diameter and a first anchor length, and a second anchor portion with a second anchor diameter and a second anchor length, the first anchor length being greater than second anchor length, and the first anchor diameter being less than the second anchor diameter, the first anchor portion having a surface texture for engaging cured in place bonding material, and the second anchor portion having a smooth surface.

9. The sill plate anchor assembly of claim 8, wherein the second flute section further comprises one or more fastening holes configured for receiving a mating mechanical fastener such that each mechanical fastener engages the shank to rotatably secure the second flute section to the shank.

10. The sill plate anchor assembly of claim 9, wherein the shank further comprises a seat member for engaging the mechanical fastener.

11. The sill plate anchor assembly of claim 10, wherein the seat member comprises a bore hole for receiving the one or more mechanical fasteners.

12. The sill plate anchor assembly of claim 11, wherein the second flute section comprises a truncated cone.

13. The sill plate anchor assembly of claim 11, wherein each of the two or more cutting teeth further comprises a leading edge, and the cutting tip of the second flute section further comprises a number of recesses corresponding to the number of cutting teeth, each recess disposed adjacent to each leading edge.

14. The sill plate anchor assembly of claim 10, wherein the seat member comprises one of a flat area or a recessed area for engaging the one or more mechanical fasteners.

15. The sill plate anchor assembly of claim 14, wherein the second flute section comprises a truncated cone.

16. The sill plate anchor assembly of claim 14, wherein each of the two or more cutting teeth further comprises a leading edge, and the cutting tip of the second flute section further comprises a number of recesses corresponding to the number of cutting teeth, each recess disposed adjacent to each leading edge.

17. The sill plate anchor assembly of claim 10, wherein the second flute section comprises a truncated cone.

18. The sill plate anchor assembly of claim 10, wherein each of the two or more cutting teeth further comprises a leading edge, and the cutting tip of the second flute section further comprises a number of recesses corresponding to the number of cutting teeth, each recess disposed adjacent to each leading edge.

19. The sill plate anchor assembly of claim 8, wherein the second flute section comprises a truncated cone.

20. The sill plate anchor assembly of claim 8, wherein each of the two or more cutting teeth further comprises a leading edge, and the cutting tip of the second flute section further comprises a number of recesses corresponding to the number of cutting teeth, each recess disposed adjacent to each leading edge.

* * * * *